(12) United States Patent
Schwerk

(10) Patent No.: US 8,781,997 B2
(45) Date of Patent: Jul. 15, 2014

(54) REUSING REPORTING COMPONENTS IN CUSTOMIZED CUBES

(75) Inventor: Uwe Schwerk, Heidelberg (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/595,922

(22) Filed: Aug. 27, 2012

(65) Prior Publication Data

US 2014/0058998 A1   Feb. 27, 2014

(51) Int. Cl.
  *G06F 17/30*   (2006.01)
(52) U.S. Cl.
  USPC ................................................ 707/603
(58) Field of Classification Search
  USPC ................................................ 707/603
  See application file for complete search history.

(56) References Cited

U.S. PATENT DOCUMENTS 6,477,536 B1 * 11/2002 Pasumansky et al. ............ 1/1
8,099,383 B2 * 1/2012 Naibo et al. ............... 707/603

OTHER PUBLICATIONS

Dundas Data Visualization, Inc., Creating a Virtual Cube, May 2, 2011.*
Dundas Data Visualization, Inc., Building a Report, May 2, 2011.*
OLAP cube, *Wikipedia*, visited Aug. 17, 2012, 4 pages.
Online Analytical Processing, *Wikipedia*, visited Aug. 17, 2012, 6 pages.
Schneider, "SAP Business ByDesignStudio—Application Development," Galileo Press, Published Nov. 1, 2011, Chapter 8, 29 pages.

* cited by examiner

*Primary Examiner* — James Trujillo
*Assistant Examiner* — William Spieler
(74) *Attorney, Agent, or Firm* — Klarquist Sparkman, LLP

(57) ABSTRACT

Disclosed herein are representative embodiments of tools and techniques for reusing derived measures of cubes in customized cubes. According to one exemplary technique, a base cube of a customized cube is determined. Additionally, a footprint of a derived measure of the base cube is determined. Also, a report that uses the customized cube is generated using the derived measure of the base cube.

19 Claims, 12 Drawing Sheets

FIG. 9

ANALYTICAL REPORT

▼ COLUMNS
ORDERING YEAR
KEY FIGURE
... — 910

▼ ROWS
PO STATUS
DOCUMENT TYPE
DOC. ITEM
... — 920

| | | | | ORDERING YEAR | 2012 | 930 | | | 950 |
|---|---|---|---|---|---|---|---|---|---|
| 970 PO STATUS | DOCUMENT TYPE | DOC. ITEM | ORDERED QUANTITY | ORDER DELIVERY DATE | DELIVERED QUANTITY | DELIVERY DATE | INVOICED VALUE IN COMPANY CURRENCY |
| CONF. RCVD | NOT ASSIGNED | # | 80,00 h | # | | | |
| FINISHED | GDS AND SVC CONF | 1 | 6,00 ea | 11.06.2012 | 6,00 ea | 11.06.2012 | |
| | INBOUND DELIVERY | 10 | 10,00 ea | # | 20,00 ea | 09.06.2012 | |
| | INVOICE | 1 | 8,68 ea | # | * | 21.06.2012 | 1.216,98 MXN |
| FOLLOW-UP DOC. CREATED 980 | GDS AND SVC CONF | 2 | 2,00 ea | 0 | 5,00 ea | 12.06.2012 | |
| | INVOICE | 1 | 10,29 ea | 0 | | | |
| | | 2 | 10,00 ea | 10.06.2012 | | | 1.216,98 MXN |
| | | 3 | 10,00 ea | 10.06.2012 — 940 | 960 | 1.216,98 MXN |
| | | 4 | 10,00 ea | 10.06.2012 | | | 1.216,98 MXN |
| | | 5 | 10,00 ea | 10.06.2012 | | | 1.216,98 MXN |
| | | 6 | 10,00 ea | 10.06.2012 | | | 1.216,98 MXN |
| | | 7 | 10,00 ea | 10.06.2012 | | | |
| SENT | GDS AND SVC CONF | 1 | 2,00 ea | 0 | 0,00 ea | 08.06.2012 | |
| | | 2 | 2,50 ea | 0 | 0,00 ea | 08.06.2012 | |
| | | 3 | 3,00 ea | # | 0,00 ea | 08.06.2012 | |
| | | 4 | 3,00 ea | # | 0,00 ea | 08.06.2012 | |
| | | 5 | 2,00 ea | # | 0,00 ea | 08.06.2012 | |
| | INVOICE | 1 | 2,00 ea | 15.06.2012 | | | 2.000,00 USD |
| | | 2 | 2,00 ea | 15.06.2012 | | | 2.000,00 USD |
| | | 3 | 2,00 ea | 15.06.2012 | | | 2.000,00 USD |

US 8,781,997 B2

REUSING REPORTING COMPONENTS IN CUSTOMIZED CUBES

BACKGROUND

As businesses have gained the ability to capture various types and amounts of data relating to their business transactions, tools and techniques for analytical analysis and reporting of data captured in database systems has grown. Some traditional database systems have provided reports built on predetermined data sources. Although traditional database systems have provided reports built on predetermined data sources, these traditional reporting technologies are rigid in design and are limited.

SUMMARY

Among other innovations described herein, this disclosure presents various representative embodiments of tools and techniques for reusing reporting components of cubes in customized cubes.

In an exemplary technique, one or more base cubes of a customized cube can be determined. For example, the structure of the customized cube can be inspected to indicate that the customized cube was created using a join or union of one or more base cubes. Also, a footprint of a derived measure of a base cube of the customized cube can be determined. For example, the measures and dimensions that are used to model the derived measure can be determined as a footprint of the derived measure. The customized cube can be inspected to determine that the footprint of the derived measure is included in the customized cube. Based at least in part on the customized cube including the footprint, a report built on the customized cube can be modeled using the derived measure of the base cube. For example, the derived measure of the base cube can shine through from the base cube and be reused as a reporting component for the customized cube because the customized cube includes the dimensions and measures used to model the derived measure.

According to another exemplary technique, at least one base cube of a customized cube is determined. Additionally, a footprint of at least one derived measure of the at least one base cube is determined. Also, a report that uses the customized cube is generated using the at least one derived measure of the at least one base cube.

According to a further exemplary technique, a footprint of at least one derived measure of a base cube is determined. Additionally, it is determined that a customized cube includes the footprint of the at least one derived measure. Also, a report that is built on the customized cube is generated at least using the at least one derived measure.

According to yet another exemplary technique, a selection of a customized cube as a data source for a report is received, and a determination is made that at least one base measure of the customized cube is mapped to at least one base measure of a base cube. Also, a footprint of at least one derived measure of the base cube is determined. Additionally, a determination is made that the customized cube includes the footprint of the at least one derived measure. Also, based at least on the determination that the customized cube includes the footprint of the at least one derived measure, the at least one derived measure is listed as a list option during a modeling of the report.

This summary is provided to introduce a selection of concepts in a simplified form that are further described below. This summary is not intended to identify key features or essential features of the claimed subject matter, nor is it intended to be used to limit the scope of the claimed subject matter. The foregoing and other objects, features, and advantages of the technologies will become more apparent from the following detailed description, which proceeds with reference to the accompanying figures.

BRIEF DESCRIPTION OF THE DRAWINGS

FIG. 9 is a diagram that illustrates an exemplary implementation of an analytical report built on a customized cube.

DETAILED DESCRIPTION

Exemplary System for Generating a Report that Reuses a Derived Measure

Figure 1:
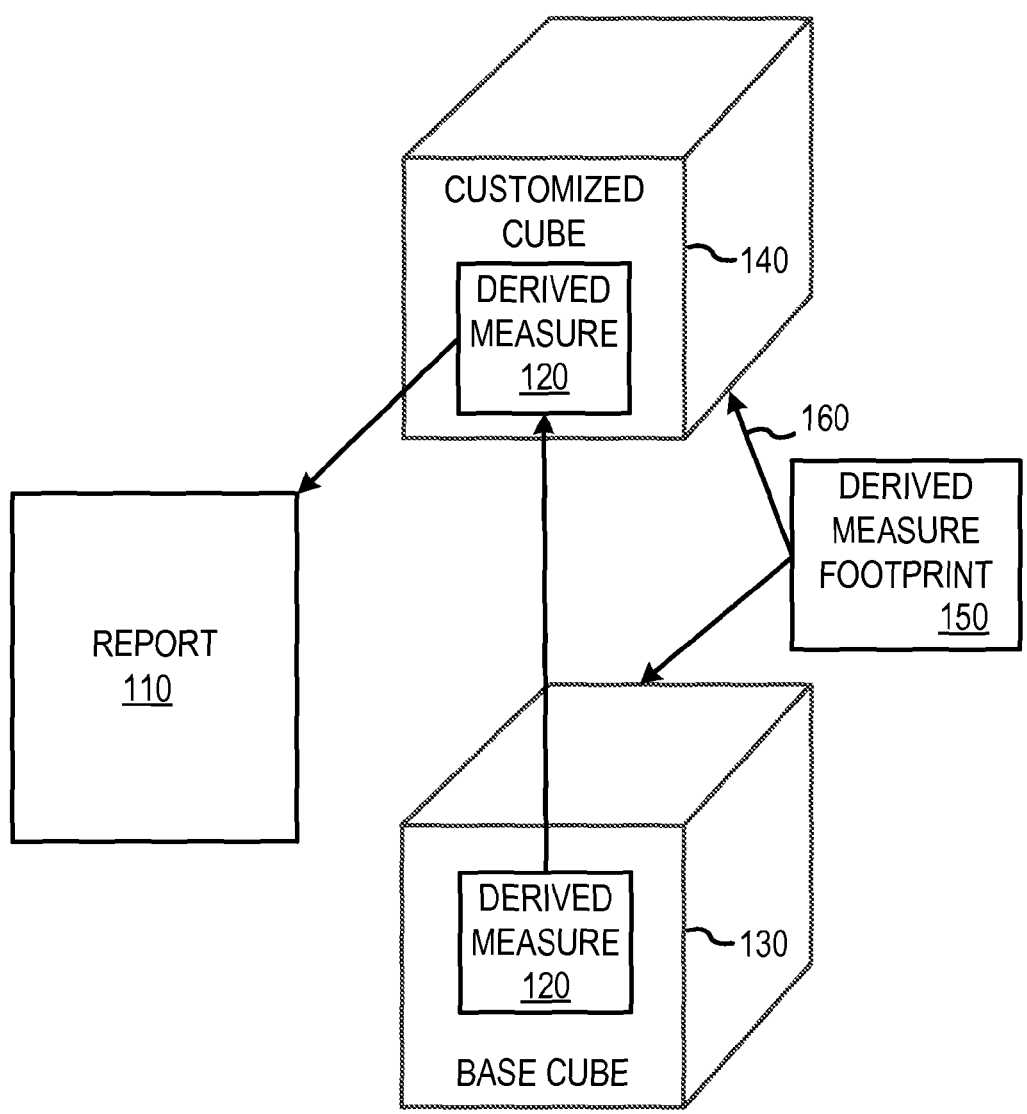
FIG. 1 is a diagram illustrating an exemplary system for generating a report using a derived measure reused from a base cube.

Creating customized data sources from data sources provided in a database system can be desirable for users. Also, the ability to efficiently generate reports that include derived measures without manually creating new derived measures for the customized data source can also be desirable. For example, a user of a database may want to generate a join or union cube and model a report built on the customized cube to use derived measures automatically determined to be available for the customized cube. FIG. 1 is a diagram illustrating an exemplary system for generating a report 110 using a derived measure 120 reused from a base cube 130. In FIG. 1, the system includes a base cube 130 and a customized cube 140 that is generated using the base cube 130. For example, a base or customized cube can include a multidimensional data source such as an online analytical processing (OLAP) cube or the like. The base cube 130 includes the derived measure 120. For example, the derived measure 120 can be included in metadata for the base cube 130.

The derived measure 120 has an associated footprint 150 that is included in base cube 130. Because the customized cube 140 is generated using the base cube 130, the footprint 150 of the derived measure 120 for the base cube 130 can also be included in the customized cube 140 as shown at 160. For example, the customized cube 140 can be generated using a join or union of one or more base cubes such as the base cube 130 and the footprint 150 of the derived measure 120 can be included in the customized cube 140.

The report 110 is a report modeled such that it uses the customized cube 140 as a data source. The derived measure 120 of base cube 130 can shine through to be available for the report 110 that uses customized cube 140 as a data source because the customized cube 140 also includes the footprint 150 of the derived measure 120. Allowing a derived measure to shine through can increase the reusability of reporting components such as derived measures, as reporting components built for base cubes can also be available for use with customized cubes.

Exemplary Method for Generating a Report

Figure 2:
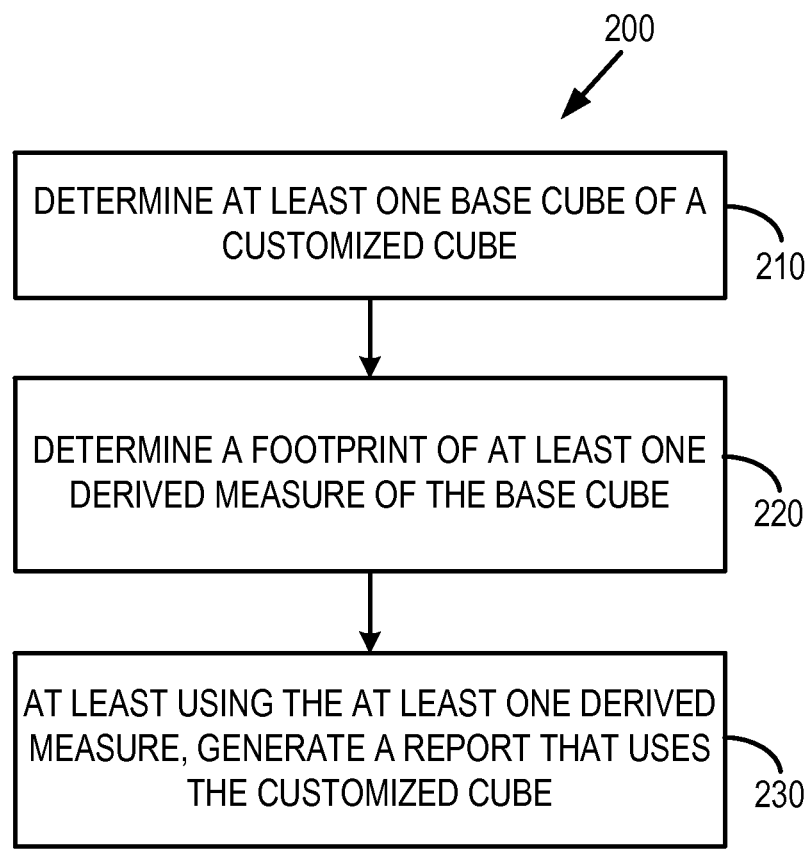
FIG. 2 is a flowchart of an exemplary method for generating a report using a derived measure reused from a base cube.

FIG. 2 is a flowchart of an exemplary method 200 for generating a report using a derived measure reused from a base cube. In FIG. 2, at least one base cube of a customized cube is determined at 210. For example, the structure of a customized cube can be inspected by automatically evaluating mapping information included in the metadata of the cube. The data of the customized cube can be determined to be mapped to data of a different cube and the different cube can be determined to be a base cube. In some implementations, in inspecting the structure of a cube a structure tree can be evaluated such that dimensions of the cube can be included in a subtree, and/or base measures of the cube can be included in a subtree. In some implementations, if the cube includes mappings from one or more dimensions and/or measures of the cube to one or more dimensions and/or measures of one or more other cubes, a determination can be made that the cube is a union cube or a join cube, and the one or more other cubes can be base cubes of the customized cube. In some implementations, the metadata for the cube can include the information indicating that the cube is a join cube or a union cube.

At 220, a footprint of at least one derived measure of the base cube is determined. For example, a base cube can include one or more derived measures. A derived measure of the base cube can be identified by an automatic inspection of the metadata of the base cube. One or more derived measures of a cube can be included in a metadata repository which can also include the metadata for the cube. A derived measure for a particular and/or identified cube can be found by searching the metadata repository for derived measures that are modeled for use with the particular and/or identified cube. A derived measure can be built (e.g., modeled) to process a portion of the data of the cube into data values for the derived measure. The portion of the data of the cube that is processed or used by the derived measure can include one or more values of one or more measures or dimensions of the cube. The set of measures and dimensions that are used by the modeled derived measure can be the footprint of the derived measure. A footprint of a derived measure can be determined by an automatic inspection of the structure and/or modeling of the derived measure. In some implementations, one or more tags, in the metadata of a cube, can be used, during an automatic inspection, to indicate which dimensions and measures of the cube are used by a derived measure to identify the footprint of the derived measure.

At 230, a report that uses at least the customized cube is generated using the at least one derived measure. For example, a report can be modeled or built such that it pulls and/or displays information from the customized cube. The report can be modeled and/or built to use the derived measure of the base cube because the derived measure of the base cube can shine through to the customized cube and be reused. For example, the customized cube can include the footprint of the derived measure which indicates that the customized cube includes the data that is to be used by the derived measure. Because the customized cube includes the footprint of the derived measure the derived measure can be available for use by the customized cube. In some implementations, the derived measure of the base cube can be logically available for use by the customized cube and reports. A report built on the customized cube can use the derived measure. In some implementations, a derived measure can be used for modeling reports and can be evaluated when a report is run or when the derived measure is requested or used. In some implementations, reports can be analytical reports which can be modeled using reporting components such as derived measures. Reporting components can be based on the underlying data source (e.g., a cube) which can represent multi-dimensional data.

Exemplary Cube that Includes a Footprint of a Derived Dimension

Figure 3:
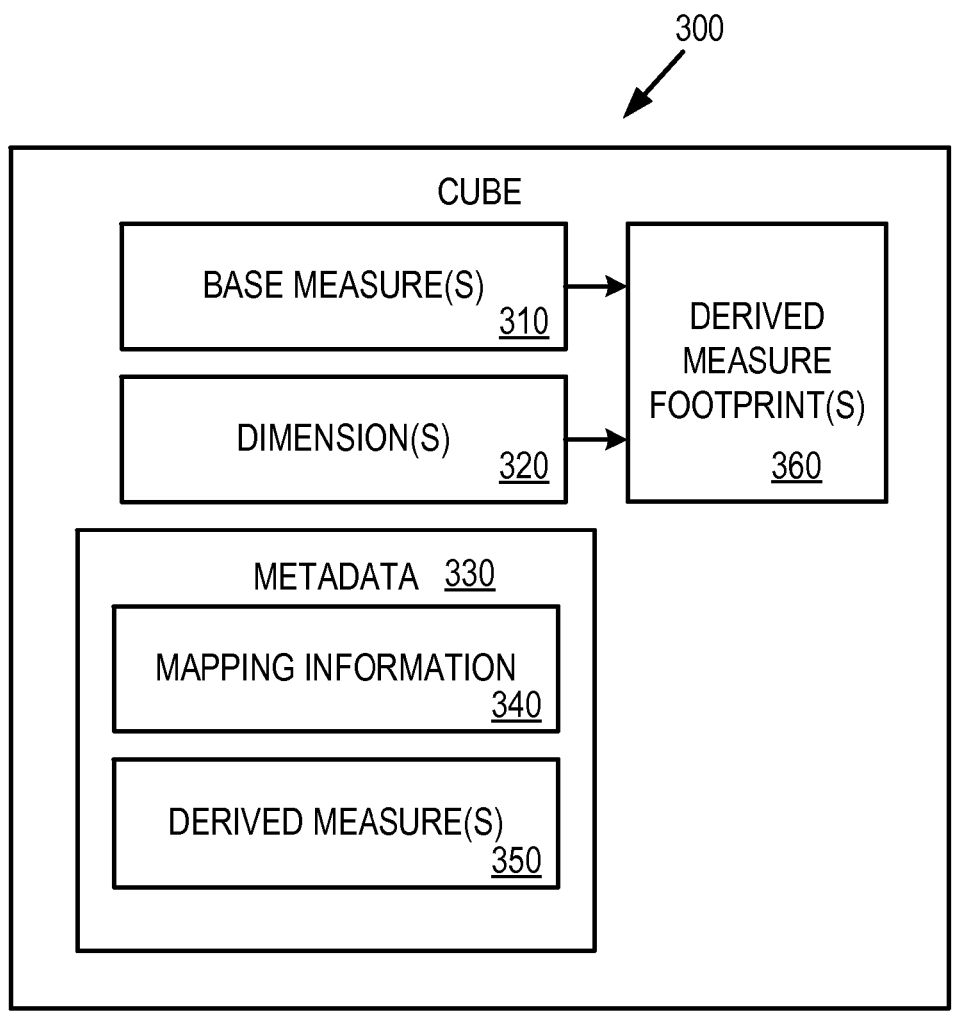
FIG. 3 is a schematic diagram of an exemplary cube that includes a footprint of a derived measure.

FIG. 3 is a schematic diagram of an exemplary cube 300 that includes a footprint of a derived dimension that can be used in any of the embodiments described herein. In some implementations, a cube can be a customized cube that is generated using a join or union operation on one or more base cubes. In some implementations, a cube can be a base cube which can be used to generate a customized cube. For example, a database system can have cubes with predetermined structures which include dimensions and base measures. These cubes with predetermined structures can be base cubes that are used to generate customized cubes. The customized cubes can be generated by performing join or union operations on the base cubes to generate cubes customized to include one or more subsets of dimensions and/or measures of the base cubes.

In some implementations, a cube can include a multidimensional data source such as an online analytical processing (OLAP) cube or the like. For example, an OLAP cube can be implemented using a relational database scheme such as star scheme, snowflake scheme, or the like. In some implementations, a cube can be a data source that provides a multidimensional analytical view of data. In some implementations, a cube can organize data included in a second persistence database. In some implementations, a cube can organize data included in a database that is not a second persistence database. For example, the cube can be implemented as a view on underlying transactional (e.g., OLTP) data.

In FIG. 3, the cube 300 can include an organized set of data including one or more base measures 310 and/or one or more dimensions 320. In some implementations, a cube can include many measures and dimensions. In some implementations, a measure can be represented using numerical data values. For example, a cube can include a measure for sales order volume and one or more numerical data values can be included in the cube that indicate sales order volumes. A base measure can be a measure which has one or more numerical data values that are stored in the cube. For example, the data of a base measure can be the raw data stored for the measure in the cube.

Dimensions can provide characteristics of measures which can be indicated by dimension data values. For example, for a cube with a measure for sales order volume, the cube can include a dimension that indicates the respective statuses of sales orders that include the respective sales order volumes. The respective statuses of the sales orders can be indicated by a dimension data value that indicates at least one of a plurality of statuses.

The cube 300 can have and/or include associated metadata such as metadata 330. The metadata 330 can include mapping information 340 and/or one or more derived measures 350. Mapping information for a cube can provide information about a cube's structure. For example, when a join or a union operation is performed on base cubes to generate a customized cube, the respective dimensions and measures of the base cubes used to generate the customized cube can be mapped from their respective base cubes to the respective corresponding dimensions and measures of the customized cube. A cube's structure can be examined to determine that the cube is a base cube or a customized cube. For example, the mapping information of the cube can be used to determine that a cube is a customized cube (e.g., the measures and/or dimensions map to base cubes) and to determine one or more base cubes that were used to generate the customized cube.

The cube 300 can include one or more derived measures with footprints 360 for the one or more base measures 310 and/or the one or more dimensions 320. A footprint can be a subset of the measures and/or dimensions of a cube that are used by a derived measure to produce one or more values for the derived measure when evaluated. For example, a cube can include one more dimensions and/or measures and a derived measure can be modeled to use values of a set of the dimensions or measures to determine one or more values for the derived measure. The set of the dimensions or measures that are used by the derived measure to generate values can be the footprint of the derived measure.

A cube can include logically accessible data. For example, data included in the cube can be logically accessed via mappings of data from the cube to another data source that stores the data such as another cube (e.g., a base cube) or database table. The data stored in the data sources can be accessed using requests when a cube is used. For example, data used from a cube can be stored in data base tables and can be requested using SQL requests or the like.

In some implementations, when a join or a union cube is generated from base cubes, the structure of the join or union cube can be evaluated to determine if it includes footprints of one or more derived measures of the base cubes. If the join or union cube includes a footprint of a derived measure of a base cube, then the derived measure of the base cube can be copied as metadata for the derived cube to be available as a derived measure of the join or union cube. In some implementations, the derived measure of a base cube can be logically accessible for use of a customized cube if the customized cube includes the footprint of the derived measure.

Exemplary Footprint of a Derived Measure

Figure 4:
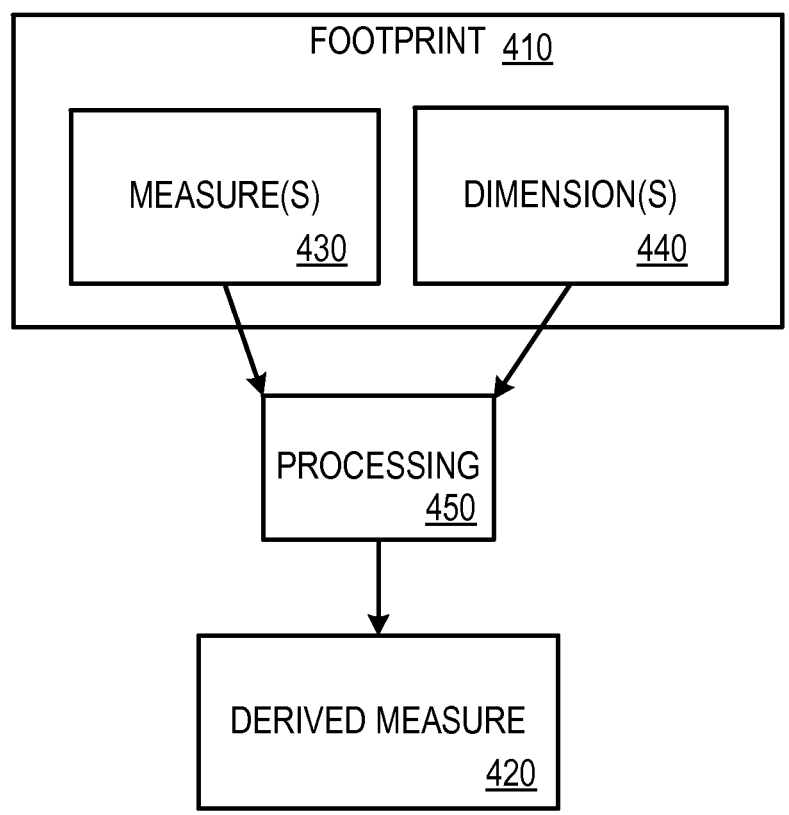
FIG. 4 is a diagram illustrating an exemplary footprint of a derived measure.

FIG. 4 is a diagram illustrating an exemplary footprint 410 of a derived measure 420. The derived measure 420 can be metadata associated with a cube (e.g., a base cube or customized cube). The derived measure 420 can be a modeling artifact used for modeling and/or building reports and can be evaluated when a report is run. The derived measure 420 can be created to work and/or run on data from a footprint 410, that includes a set of one or more measures 430 and/or one or more dimensions 440, of a cube via processing 450 to convert a portion of the raw data of the cube into data suitable for a report. For example, derive measures can be used to provide filtered cube data, calculations of cube data, sales statuses, inventory statuses, accounting information, data generated using business logic, or the like. In an exemplary implementation, a derived measure can be created to process raw data using one or more measures and dimensions of a cube to provide data appropriate for a report. For example, derived measures can be used in a report that can provide an analytical view of business data such as a report with business data reported according to generally accepted accounting principles or other analytical view of business data.

Derived measures of base cubes can shine through to customized cubes such that the derived measures of the base cubes can be used to process data available via the customized cubes. A derived measure can include a calculated measure, a restricted measure, or a group of measures. In some implementations, derived measure can include restricted or calculated key figures, or key figure groups. A restricted measure can restrict or filter the data of a measure using one or more dimensions. For example, a cube can include a measure for data for sales order volume and the sales-order-volume data can be restricted or filtered using a dimension for a sales-order status to provide the sales order volume data of sales orders that have a status of confirmed.

A calculated measure can process data in part by applying mathematical operations such as addition, subtraction, multiplication, division, or the like. Also, calculated measures can provide rates, percentages, convert data formats, aggregation of data, or apply business logic to data of a cube. Thus, a calculated measure can be complex and include coding that applies logic to process data from a cube. For example, a calculated measure can include code instructions and/or equations that process data available to a cube into one or more values for the calculated measure. In an exemplary implementation, a calculated measure can multiply a value of one measure of the cube by a value of another measure of the cube. In other implementations, a calculated measure can apply other processing to measures and/or data of a cube.

In some implementations, one or more tags, in the metadata of a cube, can be used to indicate which dimensions and measures of the cube are used by a derived measure to identify a footprint used by the derived measure. In other implementations, a footprint used by a derived measure can include a group of one or more measures (e.g., base measures and or derived measures) and/or a group of one or more dimensions. For example, a footprint of a derived measure of a cube can include a subset of the measures and/or dimensions of the cube. A determination that a derived measure can be used for a cube can be based on the cube including the footprint of the derived measure.

In some implementations of a footprint, a footprint of a derived measure can be derived from the model of the derived measure. For example, the metadata that describes how the derived measure is modeled and what dimensions and/or measures are used in the derived measure model can be evaluated to extract the information of which measures and/or dimensions are used in evaluating the derived measure from its model to determine a value for the derived measure. The one or more dimensions and/or measures that are used in a model for a derived measure can be the footprint of the derived measure. For example, a calculated measure which is modeled as a first base measure of a cube divided by a second base measure of the cube can have a footprint of the first measure and the second measure of the cube. In some implementations, the footprint for a derived measure is not stored with the metadata of the derived measure. For example, the footprint can be extracted from the model of the derived measure. In some implementations, information about a footprint of a derived measure can be stored with the metadata of the derived measure. For example, if it is costly to extract the footprint from the model of the derived measure included in metadata, the information about which measures and/or dimensions are included in the footprint for the derived measure can be stored as metadata with the metadata of the derived measure. The extracting of a footprint of a derived measure from metadata to determine if the derived measure of a cube can shine through to another cube can be referred to as coding breakout.

Having a derived measure shine through from a base cube to a customized cube can be more efficient than building derived measures for the customized cube, as building derived measures for customized cubes can be difficult and time consuming for users of a database. Additionally, the reusing of derived measures can allow updates and/or changes to derived measures of base cubes to efficiently propagate to reports built on customized cubes that reuse the derived measures of the base cubes.

Figure 5:
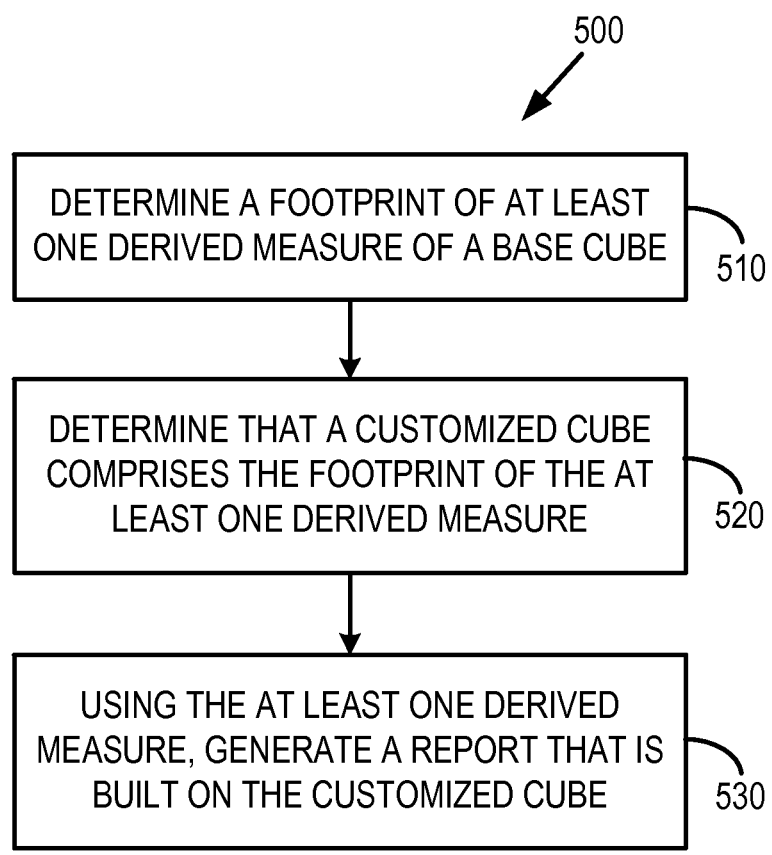
FIG. 5 is a flowchart of an exemplary method for generating a report built on a customized cube using a derived measure of a base cube.

Exemplary Method for Generating a Report Built on a Customized Cube Using a Derived Measure of a Base Cube FIG. 5 is a flowchart of an exemplary method 500 for generating a report built on a customized cube at least using a derived measure of a base cube. In FIG. 5, a footprint of at least one derived measure of a base cube is determined at 510. For example, the metadata of a base cube is automatically inspected and the set of measures and dimensions of the base cube that are used by a derived measure is determined. In some implementations, the footprint of the derived measure can be determined from the construction of the derived measure and/or metadata tags.

At 520, a determination is made that a customized cube comprises the footprint of the at least one derived measure. For example, the structure of the customized cube is automatically inspected to make a determination that the set of measures and/or dimensions used by the derived measure of the base cube are included or are not included in the customized cube. In some implementations, the structure of the customized cube is inspected to determine that customized cube includes the one or more dimensions and/or one or more measures (e.g., each of the one or more dimensions and/or one or more measures) of the footprint of the derived measure for the base cube. In some implementations, when a join or a union operation on cubes is used to generate a customized cube the dimensions and measures used to generate the customized cubes can be mapped from their respective base cubes to the customized cube. This mapping can be used to determine whether a footprint of a derived measure or a base cube is preserved in the created join or union cube.

At 530, a report that is built on the customized cube is generated at least using the at least one derived measure. For example, an analytical data report built on the customized cube can use a derived measure of a base cube if the customized cube is determined to include the footprint for the derived measure. The dimensions and measures that are included in a footprint of the derived measure can be determined by inspecting the structure and/or modeling of the derived measure.

In some implementations, a report can use a derived measure such that when the report is modeled or built, the report includes the derived measure as a model object which can produce values for the derived measure when the report is run.

In some implementations, when a report is run the report can include measures and dimensions displayed in columns and/or rows of the report and values and/or data for the measures and dimensions can be included as entries in the columns and/or rows of the report.

In some implementations, a report can be generated using a software tool that includes a user interface that lists, for selection, derived measures that are available for the data source of the report. The software tool can receive a user selection of one of the derived measures available for the data source as part of the modeling of the report, so that the derived measure is used by the report. For example, at design time of a pivot table report, a user interface can indicate available derived measures for a cube that can be included for use by the report and that can be evaluated at runtime of the report. In some implementations, during report modeling, measures and dimensions of one or more cubes that are to be accessed by the report can be selected and the included in the report based on their selection.

In some implementations, a report that has been run and is displayed can be modified to generate a report that uses a derived measure. For example, a user interface can be provided that lists, as options for selection, derived measures that can be included in the report. When selections of one or more of the listed derived measures are received the report can be modified to include the selected derived measures.

Figure 6:
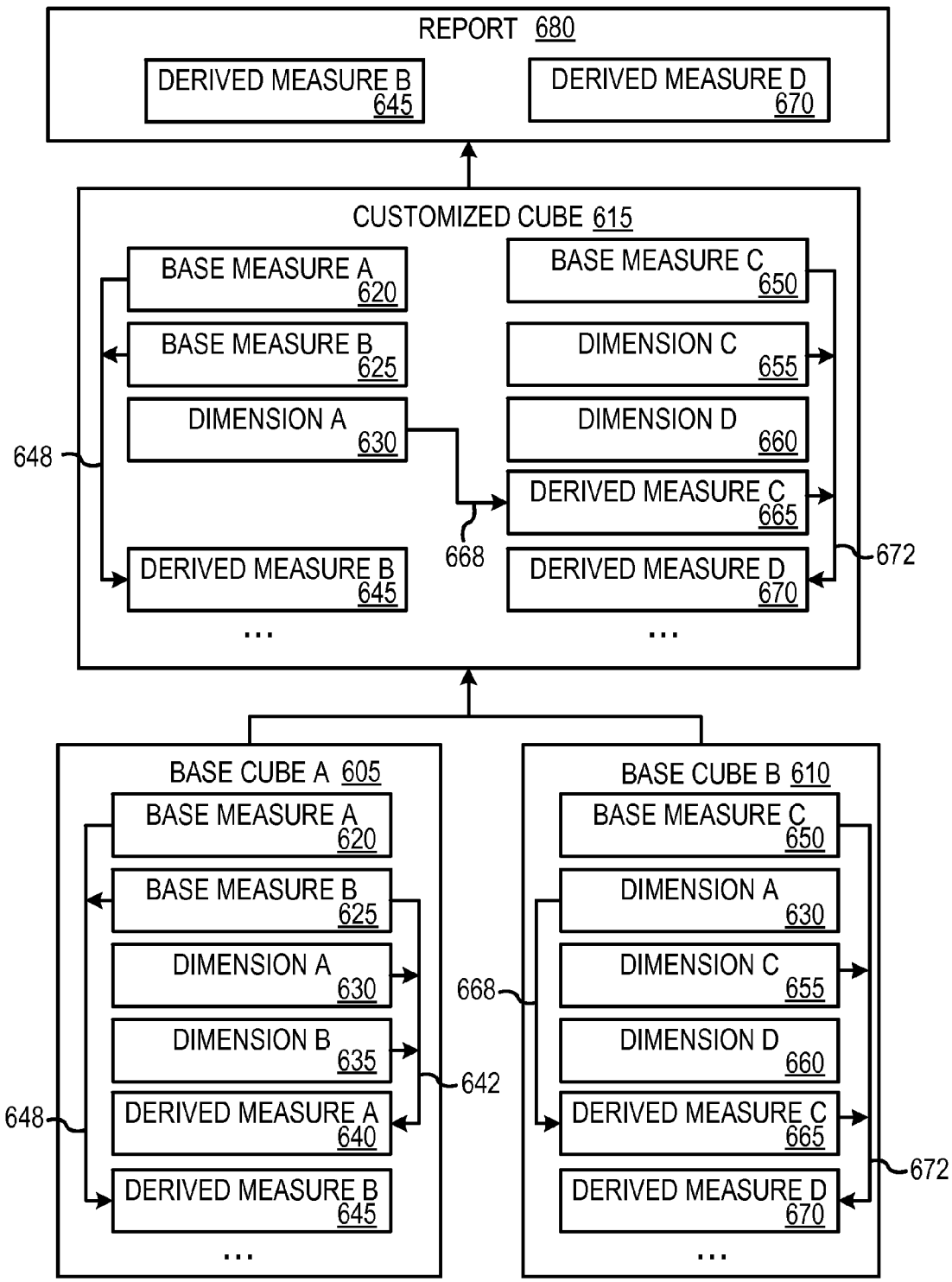
FIG. 6 is a diagram illustrating an exemplary system for reusing one or more derived measures of one or more base cubes in a report built on a customized cube.

Exemplary System for Reusing Derived Measures of Base Cubes in a Report Built on a Customized Cube FIG. 6 is a diagram illustrating an exemplary system for reusing one or more derived measures of one or more base cubes in a report built on a customized cube. In FIG. 6, base cube 605 includes data for a base measure 620, a base measure 625, a dimension 630, a dimension 635, a derived measure 640, and a derived measure 645. The derived measure 640 and the derived measure 645 are generated to be available for use with the base cube 605. The derived measure 640 has a footprint 642 which includes the base measure 625, the dimension 630, and the dimension 635. The derived measure 645 has a footprint 648 which includes the base measure 620, and the base measure 625.

The base cube 610 includes data for a base measure 650, the base measure 620, a dimension 655, a dimension 660, a derived measure 665, and a derived measure 670. For the base cube 610, the derived measure 665 has a footprint 668 which includes dimension 630. The derived measure 670 has a footprint 672 which includes the base measure 650, the dimension 655, and the derived measure 665.

The customized cube 615 is derived using a join operation on the data of the base cube 605 and the base cube 610. The customized cube 615 includes the data and/or logical access to the data for the footprint 648 of the derived measure 645 of base cube 605. The customized cube 615 includes the data and/or logical access to the data for the footprint 672 of the derived measure 670 of base cube 605. Also, the customized cube 615 includes the data and/or logical access to the data for the footprint 668 of the derived measure 665 of base cube 610. The customized cube 615 does not include data for the dimension 635 that is included in base cube 605, and therefor does not include the appropriate data for the footprint 642 for derived measure 640 of the base cube 605.

In FIG. 6, the report 680 is built or modeled using the customized cube 615 as a data source. The derived measure 645 of base cube 605 is used in the modeling of the report 680 as the derived measure is available to customized cube 615, because it includes the footprint 648 for the derived measure 645.

The report 680 is also modeled using the derived measure 670. The derived measure 670 is derived using the derived measure 665. As the customized cube 615 includes the data and/or logical access to the data for the footprint 672 of derived measure 670, which includes the footprint 668 for the derived measure 665, both of the derived measure 665 and the derived measure 670 are available to be used for reports built on the customized cube 615. As the customized cube 615 does not include data for the dimension 635 of base cube 605, the customized cube 615 does not include the data for the footprint of the derived measure 640 and therefore derived measure 640 of base cube 605 is not available for modeling or use by reports built on customized cube 615.

Figure 7:
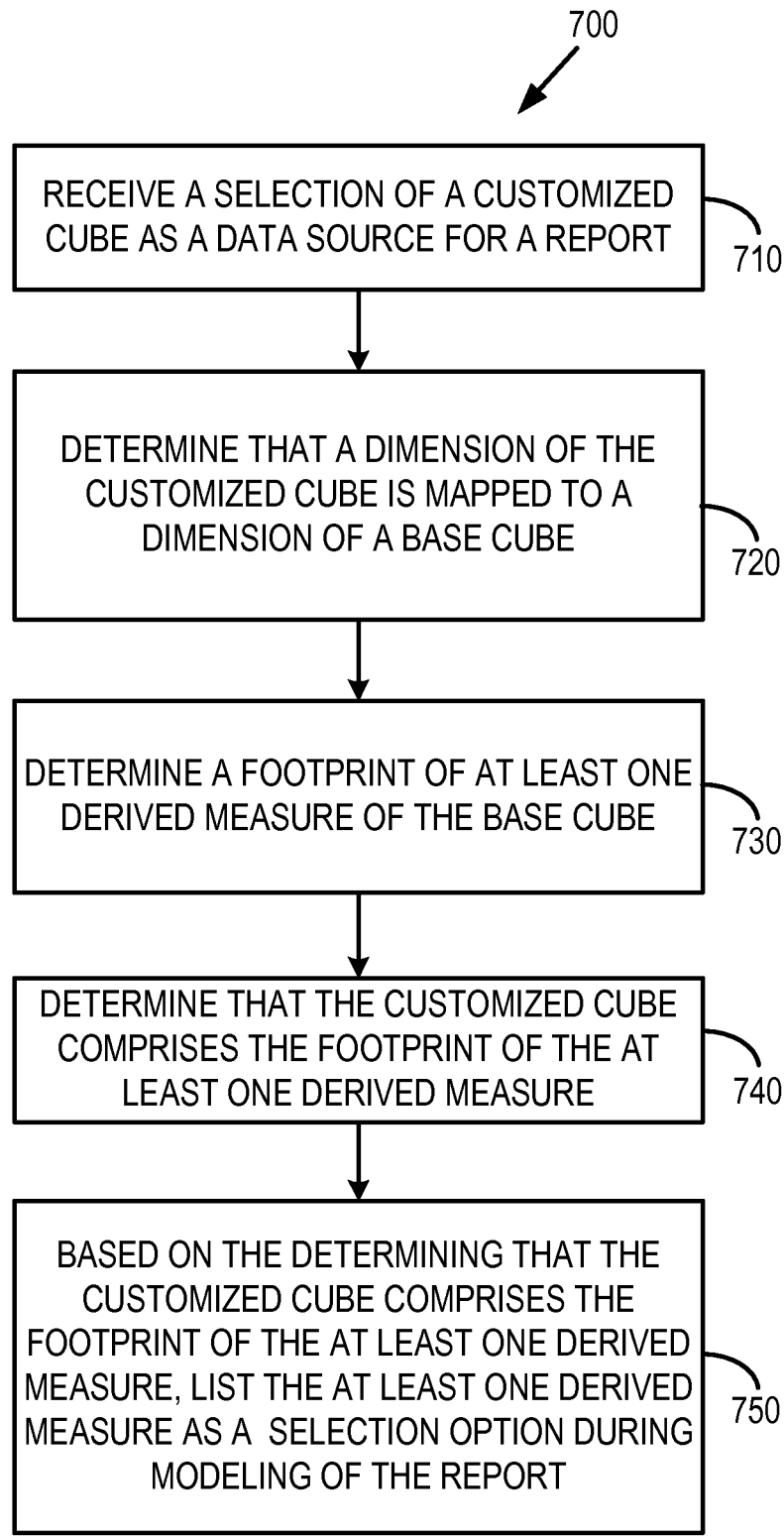
FIG. 7 is a flowchart of an exemplary method for listing a derived measure of a base cube as a list option during modeling of a report.

Exemplary Method for Listing a Derived Measure of a Base Cube as a List Option During Modeling of a Report FIG. 7 is a flowchart of an exemplary method 700 for listing a derived measure of a base cube as a selection option during modeling of a report. In FIG. 7, a selection of a customized cube as a data source for a report is received at 710. For example, a selection of a customized cube as a data source for a report can be received by a software tool for modeling a report.

At 720, a determination is made that at least one dimension of the customized cube is mapped to at least one dimension of a base cube. For example, the structure of the customized cube can be evaluated and the structure of the cube can include a mapping of one or more base measures and/or dimensions of the customized cube to one or more base measures and/or dimensions of one or more base cubes.

At 730, a footprint of at least one derived measure of the base cube is determined. For example, a set of measures and dimensions used to model the derived measure of the base cube can be determined by inspecting the modeling of the derived measure and determining which measures and dimensions are referenced and/or used in the derived measure modeling.

At 740, a determination is made that the customized cube comprises the footprint of the at least one derived measure. For example, after the footprint of the at least one derived measure is determined, the structure and/or metadata of the customized cube can be inspected to determine that the customized cube includes or does not include the set of one or more measures and/or dimensions of the footprint that are used by the derived measure. If the customized cube includes the set of one or more measures and/or dimensions of the footprint, then the customized cube can be determined to include the footprint of the derived measure.

At 750, based on the determination that the customized cube comprises the footprint of the at least one derived measure, the at least one derived measure is listed as a selection option during the modeling of a report. For example, a software tool can be used to model or build a report that uses the customized cube as a data source and a user interface of the software tool can automatically list one or more derived measures, as options for selection, that are determined to be available for use with the customized cube. Derived measures that have footprints that are included in the customized cube can be automatically determined to be available for use with the customized cube. Derived measures of base cubes that have footprints that are automatically determined not to be in the customized cube can be omitted from the list of available derived measures for the customized cube and can be unavailable for use by reports built on the customized cube. At least some of the derived measures listed for selection can be derived measures of base cubes of the customized cube. The customized cube can include the footprint of the listed derived measures of the base cube. In some implementations, when a report is run and values are to be determined for derived measures that are reused from base cubes, a logical copying of the derived measure can occur (e.g., a copying in memory) so that the derived measure can produce values (e.g., numbers) for use and/or display in the report.

In some implementations, a list of available derived measures for the customized cube can be automatically provided in a user interface while a report is being displayed. For example, a pivot table can be an analytical report built on the customized cube and while the pivot table is displayed, upon activation, a user interface can display a list of one or more reused derived measures of base cubes available for use in the report for selection. In some implementations, when a list of derived measures are displayed, a user selection of one or more of the derived measures can be received and the selected derived measures can be included in the data displayed in the report.

In some implementations, after a report is modeled, the report can be run and display data derived from one or more data sources that the report is built on. In some implementations, reports can be modeled to slice and/or dice data that is provided by a cube to provide an analytical view of the data of a cube.

Exemplary User Interface for a Software Tool that Models a Report

Figure 8:
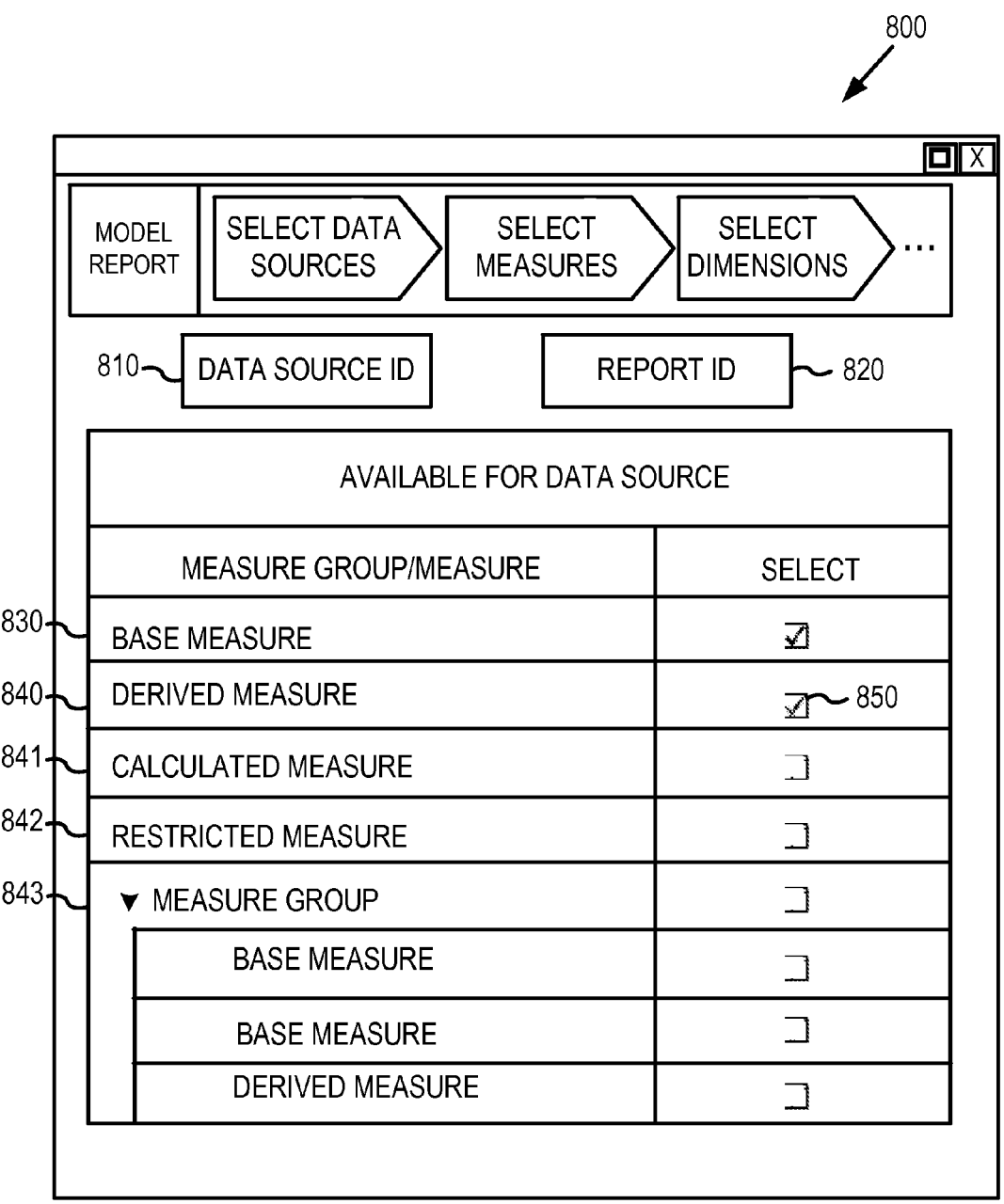
FIG. 8 is a diagram that illustrates an exemplary user interface for a software tool that can implement the modeling of a report built on a customized cube that can use derived measures of a base cube.

FIG. 8 is a diagram that illustrates an exemplary user interface 800 for a software tool that can implement the modeling of a report built on a customized cube that reuses derived measures of a base cube. The user interface 800 displays measures available for a selected data source that is a customized cube indicated by a data source identifier 810. The measures can be selected to be used in and/or by the report identified by report identifier 820. The software tool can automatically determine derived measures available for the data source by inspecting the structure of the data source determining derived measures with footprints included in the data source. The derived measures listed can be derived measures of base cubes of the customized cube that have footprints that persisted in the customized cube when it was generated. The user interface can display one or more base measures of the data source such as base measure 830. The user interface can display one or more derived measures available for the data source such as derived measures 840-843. One or more of the derived measures displayed as options for selection can be selected by the software tool receiving an indication of a user selection such as user selection 850 of derived measure 840.

Exemplary Implementation of an Analytical Report that Includes a Reused Derived Measure FIG. 9 is a diagram that illustrates an exemplary implementation of an analytical report built on a customized cube that reuses a derived measure. In FIG. 9, the report includes a listing of columns 910 and a listing of rows 920 included in the report. The report includes base measures such as base measure 930 and values for base measures such as value 940 for base measure 930. The report also uses a derived measure 950 that was reused from a base cube of the customized cube.

The report includes values for the derived measure 950 such as value 960. The report includes and/or displays dimensions of measures such as dimension 970 and values for dimensions such as dimension value 980.

Exemplary System for Creating a Join Cube that Reuses a Derived Measure

Figure 10:
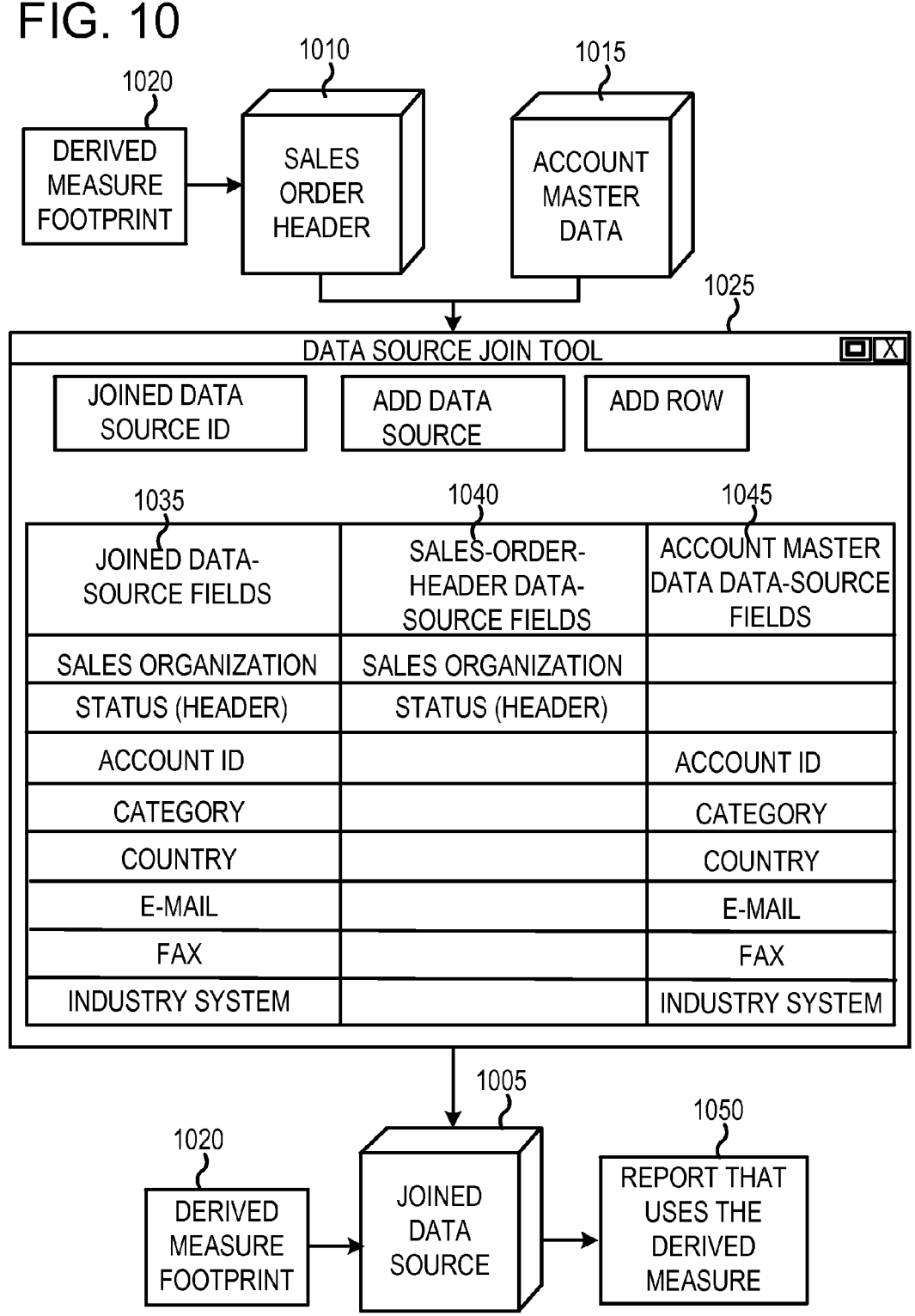
FIG. 10 is a diagram illustrating an exemplary system that produces a join cube that can reuse a derived measure of a base cube.

FIG. 10 is a diagram illustrating a system that implements a join operation of a plurality of base cubes to produce a join cube 1005 that can reuse a derived measure of a base cube 1010. The system includes the base cube 1010 and a base cube 1015. The base cube 1010 includes the footprint 1020 of a derived measure of the base cube 1010. The system includes a user interface 1025 for a software tool that allows for the selection of data from the base cubes to be included in the join cube 1005. The data-source fields 1035 join cube 1005 are derived from the data source fields 1040 of base data source 1010 and the data source fields 1045 of the base data source 1015. The join cube 1005 as generated includes the footprint 1020 for the derived measure of the base cube 1010, and therefore the derived measure of the base cube 1010 can be reused in generating a report 1050 built on the join cube 1005.

Exemplary Union Cube that Reuses a Derived Measure

Figure 11:
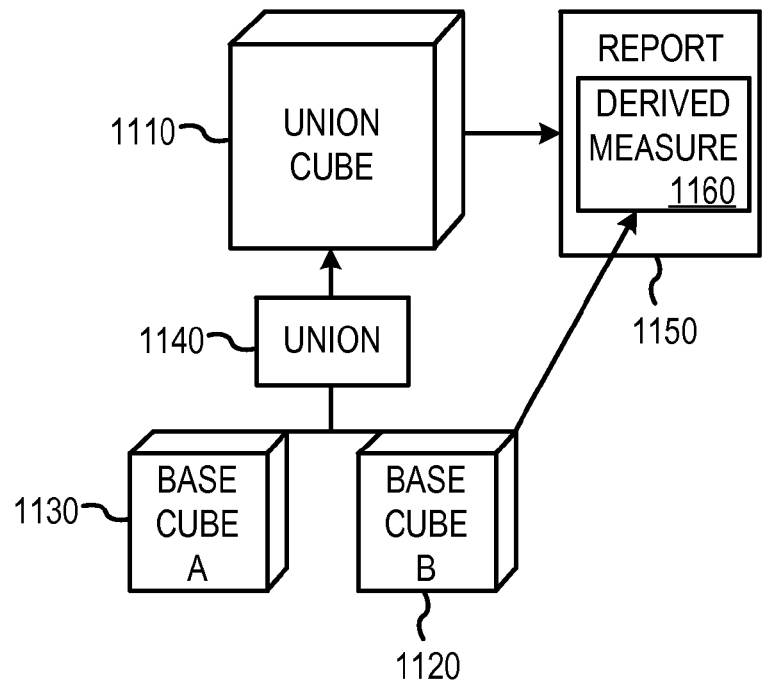
FIG. 11 is a diagram that illustrates an exemplary union cube that can reuse a derived measure of a base cube.

FIG. 11 is a diagram that illustrates and exemplary union cube 1110 that can reuse a derived measure 1160 of a base cube 1120. A union operation is performed on the base cube 1120 and the base cube 1130 at 1140 to generate the union cube 1110. The report 1150, which pulls information from the union cube 1110, can use the derived measure 1160 of the base cube 1120.

Exemplary Join Cube that Reuses a Derived Measure

Figure 12:
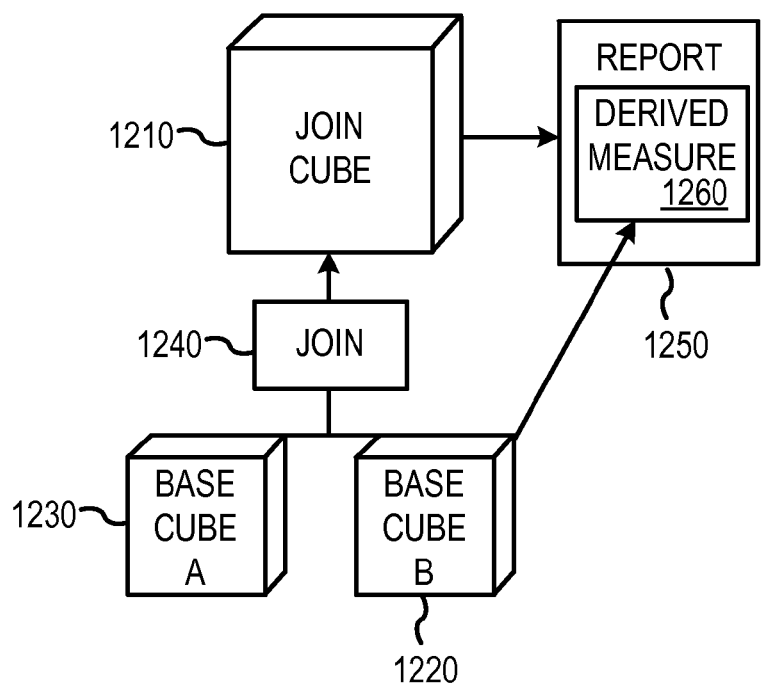
FIG. 12 is a diagram that illustrates an exemplary join cube that can reuse a derived measure of a base cube.

FIG. 12 is a diagram that illustrates and exemplary join cube 1210 that can reuse a derived measure 1260 of a base cube 1220. A join operation is performed on the base cube 1220 and the base cube 1230 at 1240 to generate the join cube 1210. The report 1250, which pulls information from the join cube 1210, can use the derived measure 1260 of the base cube 1220.

Exemplary Computing System

Figure 13:
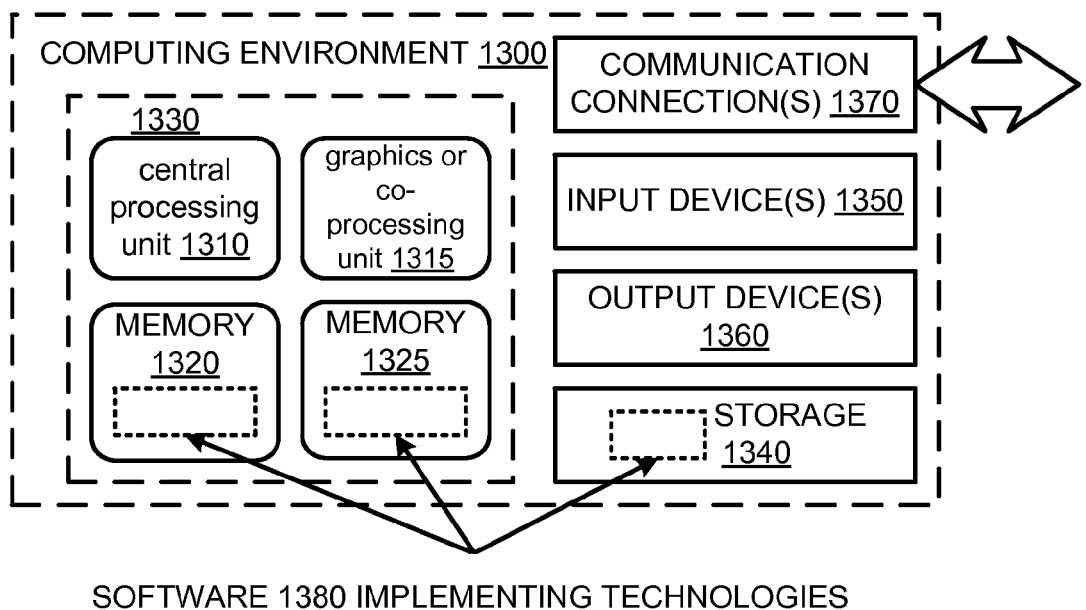
FIG. 13 is a schematic diagram illustrating an exemplary computing system in which any of the described embodiments can be implemented.

FIG. 13 is a schematic diagram that illustrates a generalized example of a suitable computing system 1300 in which several of the described innovations may be implemented. The computing system 1300 is not intended to suggest any limitation as to scope of use or functionality, as the innovations may be implemented in diverse general-purpose or special-purpose computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s). The memory 1320, 1325 stores software 1380 implementing one or more technologies for reusing reporting components in customized cubes, in the form of computer-executable instructions suitable for execution by the processing unit(s).

A computing system may have additional features. For example, the computing system 1300 includes storage 1340, one or more input devices 1350, one or more output devices 1360, and one or more communication connections 1370. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 may be removable or non-removable, and includes magnetic disks, magnetic tapes or cassettes, CD-ROMs, DVDs, or any other medium which can be used to store information in a non-transitory way and which can be accessed within the computing system 1300. The storage 1340 stores instructions for the software 1380 implementing one or more technologies for reusing reporting components in customized cubes.

The input device(s) 1350 may be a touch input device such as a keyboard, mouse, pen, or trackball, a voice input device, a scanning device, or another device that provides input to the computing system 1300. For video encoding, the input device(s) 1350 may be a camera, video card, TV tuner card, or similar device that accepts video input in analog or digital form, or a CD-ROM or CD-RW that reads video samples into the computing system 1300. The output device(s) 1360 may be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Exemplary Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore I claim as my invention all that comes within the scope of the claims.

I claim:

1. A method implemented at least in part using a computing device, the method comprising:
   determining at least one base cube of a customized cube;
   determining a footprint of at least one derived measure of the base cube;
   determining whether the customized cube comprises the footprint of the at least one derived measure of the base cube; and
   based at least on determining that the customized cube does comprise the footprint of the at least one derived measure, listing the at least one derived measure as a selection option during modeling of a report; and
   using the at least one derived measure, generating a report that uses the customized cube.

2. The method of claim 1, wherein the determining the at least one base cube of the customized cube comprises inspecting a structure of the customized cube.

3. The method of claim 2, wherein the inspecting the structure of the customized cube comprises determining that the structure of the customized cube comprises a mapping of at least one base measure or at least one dimension of the base cube to at least one base measure or at least one dimension of the customized cube.

4. The method of claim 1, wherein the determining the footprint comprises determining a subset of dimensions and/or measures of the base cube used to model the at least one derived measure.

5. The method of claim 1, wherein the generating the report that uses the customized cube is based in part on the determining that the customized cube comprises the footprint of the at least one derived measure.

6. The method of claim 1, further comprising receiving a selection of the customized cube as a data source for the report.

7. The method of claim 1, further comprising displaying a report that uses the customized cube, the report comprising a value of the at least one derived measure.

8. The method of claim 1, wherein the customized cube comprises a join cube or a union cube.

9. The method of claim 1, wherein generating the report comprises:
   providing the at least one derived measure as a selection option for the report; and
   receiving a selection of the selection option for the at least one derived measure.

10. The method of claim 1, further comprising deriving the customized cube using a join operation or a union operation on the base cube and at least one other cube.

11. The method of claim 1, wherein the at least one derived measure is modeled to be used with the base cube.

12. The method of claim 1, wherein the at least one derived measure is copied as metadata for the customized cube.

13. The method of claim 1, wherein the at least one derived measure shines through from the base cube to be available for the customized cube.

14. The method of claim 1, wherein the derived measure comprises a restricted measure, a calculated measure, or a group of measures.

15. A computing system that includes a processor and memory, the memory storing computer-executable instructions for causing the computing system to perform a method, the method comprising:
   determining a footprint of at least one derived measure of a base cube;
   determining whether a customized cube comprises the footprint of the at least one derived measure;
   based at least on determining that the customized cube does comprise the footprint of the at least one derived measure, listing the at least one derived measure as a selection option during modeling of a report that is built on the customized cube; and
   using the at least one derived measure, generating the report that is built on the customized cube.

16. The computing system of claim 15, wherein the determining the footprint comprises determining a subset of dimensions and/or measures of the base cube used by the at least one derived measure.

17. The computing system of claim 15, wherein generating the report comprises providing the at least one derived measure as a selection option for the report.

18. The computing system of claim 15, wherein the determining that the customized cube comprises the footprint of the at least one derived measure comprises:
   determining that the customized cube includes dimensions and/or measures used by the at least one derived measure.

19. One or more computer-readable storage media storing computer-executable instructions for causing a computing system to perform a method, the method comprising:
   receiving a selection of a customized cube as a data source for a report;
   determining that at least one dimension of the customized cube is mapped to at least one dimension of a base cube;
   determining a footprint of at least one derived measure of the base cube;
   determining whether the customized cube comprises the footprint of the at least one derived measure; and based at least on the determining whether the customized cube comprises the footprint of the at least one derived measure, switching between
(a) listing the at least one derived measure as a selection option during modeling of the report; and
(b) omitting the at least one derived measure as a selection option during modeling of the report.

\* \* \* \* \*